(12) United States Patent
Chabanne

(10) Patent No.: US 7,797,606 B2
(45) Date of Patent: Sep. 14, 2010

(54) METHOD FOR CODING BIOMETRIC DATA, METHOD FOR CONTROLLING IDENTITY AND DEVICES FOR CARRYING OUT SAID METHODS

(75) Inventor: Hervé Chabanne, Mantes la Jolie (FR)

(73) Assignee: Morpho, Paris (FR)

( * ) Notice: Subject to any disclaimer, the term of this patent is extended or adjusted under 35 U.S.C. 154(b) by 935 days.

(21) Appl. No.: 11/570,992

(22) PCT Filed: Jun. 22, 2005

(86) PCT No.: PCT/FR2005/001577

§ 371 (c)(1),
(2), (4) Date: Dec. 20, 2006

(87) PCT Pub. No.: WO2006/008395

PCT Pub. Date: Jan. 26, 2006

(65) Prior Publication Data

US 2009/0177939 A1    Jul. 9, 2009

(30) Foreign Application Priority Data

Jun. 22, 2004    (FR)    .................................. 04 06794

(51) Int. Cl.
*H03M 13/00*    (2006.01)
(52) U.S. Cl. ........................ 714/752; 714/747; 713/186; 380/28
(58) Field of Classification Search ................ 714/752, 714/747; 713/186, 176, 168; 380/28
See application file for complete search history.

(56) References Cited

U.S. PATENT DOCUMENTS 7,237,115 B1 * 6/2007 Thomas et al. ............... 713/176
2005/0131811 A1 * 6/2005 Ranzini et al. ................ 705/39

FOREIGN PATENT DOCUMENTS

WO    WO 00/51244    8/2000
WO    WO 02/078249 A1    10/2002

OTHER PUBLICATIONS

McEliece, "A Public-Key Cryptosystem Based on Algebraic Coding Theory", DSN Progress Report 42-44, pp. 114-116, Jan. and Feb. 1978.
International Search Report PCT/FR2005/001577; report dated Oct. 21, 2005.
Davida et al., "On Enabling Secure Applications Through Off-Line Biometric Identification", IEEE, pp. 148-157, 1998.

* cited by examiner

*Primary Examiner*—Guy J Lamarre
(74) *Attorney, Agent, or Firm*—Miller, Matthias & Hull

(57) ABSTRACT

The invention relates to a coding method consisting of the following steps: biometric data associated with an individual is obtained; a word, relating to an error correction code, selected in order to correct a quantity of errors in a relation to a statistical quantity of errors between two biometric measurements relating to the same individual, is generated, said word dissimulating information relating to said individual with the aid of a private function; and a combination is created between the biometric data thus obtained and the word thus generated.

32 Claims, 2 Drawing Sheets

METHOD FOR CODING BIOMETRIC DATA, METHOD FOR CONTROLLING IDENTITY AND DEVICES FOR CARRYING OUT SAID METHODS

CROSS-REFERENCE TO RELATED APPLICATION

This is the U.S. National Phase of International Application No PCT/FR2005/01577 filed 22 Jun. 2005, the entire disclosure of which is incorporated herein by reference

FIELD OF THE DISCLOSURE

The present invention relates to the coding of biometric data.

BACKGROUND OF THE DISCLOSURE

The use of biometry is spreading on account, in particular, of its natural and permanent association with an individual. In particular, biometry can be used for identity checking purposes.

Thus, it is common to store, in a database, biometric data relating to respective individuals, for example, fingerprints, characteristics of the iris of the eyes, of the voice, etc. This phase is generally called enrolment.

Subsequently, the identity of an individual having previously formed the subject of the enrolment, or at least the presence of his biometry in the database, can be checked by performing a biometric measurement of this individual and by comparing it with the biometric data stored in the database. When the biometric measurement corresponds to certain of the biometric data stored, this signifies that there is identity between the individual in question and that whose said corresponding biometric data have been stored during a prior enrolment.

However, a problem arises on account of the variability of the biometric measurements. Specifically, when the biometry considered is a fingerprint, for example, the angle of presentation of the finger and the pressure exerted by the finger on the print sensor are examples of parameters liable to significantly influence the result of the measurement. A strict comparison of two distinct biometric measurements relating to one and the same individual could therefore culminate in an erroneous conclusion of absence of identity.

WO 00/51244 discloses a method able to limit this drawback. For this purpose, it proposes to code the biometric data stored with the aid of an error correcting code.

It is recalled that there exists a multitude of error correcting codes whose common characteristic is to generate a word from an initial item while introducing redundancy thereinto. For example, for an initial item i, the word generated may be written $c=f(i)$, where f is a public function relating to a given error correcting code. A person knowing the error correcting code used can then retrieve the item i from the word c and the function inverse to f, i.e. $i=f^{-1}(c)$.

In WO 00/51244, each of the biometric data is coded with a respective word of an error correcting code, so as to be considered to be a "corrupted" expression of said word. Stated otherwise, a biometry b is likened to a word c picked at random from a chosen code, in which a certain number of modifications have appeared. When these various quantities are represented by binary strings, this is equivalent to considering that $b=c \oplus \delta$, where $\oplus$ designates the exclusive OR operator and where $\delta$ is a binary string whose "1" bits indicate differences between corresponding bits of b and c (i.e. $\delta=b \oplus c$).

For each biometry b, a value, dependent on c, and the corresponding value of $\delta$ are stored. The value dependent on c uses a known hash function h (for example, SHA-1, MD5, RIPE-MD, HAVAL and SNERFU) whose result h(c) is a digest of c on the basis of which it is not possible to retrieve the value of c for certain. This precludes a third party having access to the database from being able to retrieve the biometry of the individuals having formed the subject of a prior enrolment.

Subsequently, when an individual turns up for an identity check, his biometry b' is measured. When the biometry b' is associated with the same individual as a biometry b for which parameters h(c) and $\delta$ have been previously stored, b' can be expressed as a binary string which is akin to b, to within erasures and bit errors, related to the difference existing between two biometric measurements of one and the same individual as mentioned above. In mathematical form, this may be written:

$$b'=b \oplus errors \oplus erasures.$$

By performing an exclusive OR of b' and of $\delta$, for each of the values of $\delta$ previously stored, we then obtain an expression for a word c' of the error correcting code chosen, relating to b'. According to the foregoing, c' is equal to the word c, to within said erasures and binary errors, it being possible to write this: $b' \oplus \delta = c' = c \oplus errors \oplus erasures$. As the error correcting code of which the word c forms part has been chosen precisely so that a certain quantity of errors are corrected, it is then possible to retrieve the equivalence between the words c and c'.

A hash of c', h(c'), can thus be compared with the h(c) previously stored so as to verify the identity between these words One thus ensures that the biometry b' is indeed that of the individual whose biometry b has been associated with the pair $(h(c),\delta)$ during a prior enrolment.

However, the method disclosed by WO 00/51244 presents several drawbacks. First of all, this method poses a problem in terms of security. Specifically, if a third party knowing the error correcting code used has access to the database of pairs $(h(c),\delta)$, he is then able to determine whether an individual has formed the subject of a prior enrolment, on the basis of his biometry b. To do this, he proceeds as indicated hereinbelow. He performs for example an exclusive OR of the biometry b with various $\delta$ stored in the database and he carries out a hash of the result of the first operation, by virtue of the hash function h, so as to compare it with the h(c) stored in correspondence with each of the $\delta$ considered. Such a situation is not desirable for obvious reasons.

Additionally, the need to carry out a hash of the code words according to the teaching of WO 00/51244 prevents the coding being exploited so as to incorporate the useful item thereinto, since such an item would in any case be lost in the digest result emanating from the hash.

One aim of the present invention is to alleviate these drawbacks.

Another aim of the present invention is to carry out a coding of biometric data such that it prevents unauthorized persons from performing an identity check on the basis of the biometric data thus coded.

Another aim of the invention is to allow a coding of biometric data that is able to incorporate the useful item.

Another aim of the invention is to allow an identity check on the basis of coded biometric data and of pertinent items relating to respective individuals, said identity check being able to be carried out only by authorized persons.

SUMMARY OF THE DISCLOSURE

The invention thus proposes a method of coding biometric data associated with respective individuals, comprising the following steps:

obtaining biometric data associated with an individual;

generating a word relating to an error correcting code chosen so as to correct a quantity of errors in conjunction with a statistical quantity of errors between two biometric measurements relating to one and the same individual, the word concealing, with the aid of a private function, an item relating to said individual; and performing a combination between the biometric data obtained and the word generated.

Said combination is, for example, an exclusive OR operation between the biometric data obtained and the word generated.

By virtue of this coding, only persons knowing said private function are able, without excessive effort, to retrieve the item concealed in the word with which the biometric data have been coded.

Advantageously, said item concealed in a word relating to the error correcting code, with which the biometric data associated with an individual are coded, is an identity of said individual.

Advantageously, the coding of the biometric data with a respective word relating to an error correcting code, each word concealing, with the aid of a private function, an item relating to an individual associated with the corresponding biometric data, complies with the McEliece cryptosystem.

It is moreover possible to modify or erase a substantially predetermined quantity of binary elements for each word with which respective biometric data are coded. This makes it possible in particular to attain a preset level of difficulty of retrieving the item concealed in said word, without knowing said private function. Such an embodiment is especially advantageous for bringing the quantity of errors in each word to the maximum quantity of errors that the error correcting code chosen can correct, when the statistical quantity of errors between two biometric measurements relating to one and the same individual is less than or equal to a maximum quantity such as this.

The invention furthermore proposes a method of checking identity on the basis of previously stored biometric data, the biometric data being associated with respective individuals and each being coded with a respective word relating to an error correcting code, each word concealing, with the aid of a private function, an item relating to the individual associated with the corresponding biometric data, the error correcting code being chosen so as to correct a quantity of errors in conjunction with a statistical quantity of errors between two biometric measurements relating to one and the same individual. The method comprises the following steps:

performing a biometric measurement relating to an individual;

performing a combination between said biometric measurement and certain at least of the stored coded biometric data;

decoding the result of said combination on the basis of said private function, so as to retrieve the item concealed in the word with which the biometric data associated with said individual had been previously coded.

The fact of retrieving an item on completion of the decoding step is an indication that said individual forming the subject of a biometric measurement has previously seen his biometric data coded and stored.

When the item concealed is the identity of an individual, a check is moreover advantageously carried out, in a later step, to verify that the identity retrieved after decoding of the result of the exclusive OR between the biometric measurement relating to said individual and certain at least of the coded biometric data stored corresponds to an identity provided by said individual. This verificatory check makes it possible to ensure that the individual has actually formed the subject of a prior enrolment.

The invention furthermore proposes a coding device comprising means fox implementing the above-mentioned method of coding.

The invention furthermore proposes a checking device comprising means for implementing the above-mentioned identity checking method.

These devices may possibly be grouped together within one and the same system.

BRIEF DESCRIPTION OF THE DRAWINGS

Other features and advantages of the present invention will appear in the description hereinafter of nonlimiting exemplary embodiments, with reference to the appended drawings, in which.

DETAILED DESCRIPTION

As explained in the introduction, the measurement of biometric data relating to an individual varies from one occasion to another. This variation is also dependent on the type of biometric data considered (iris of the eyes, fingerprints, vocal characteristics, etc.).

Figure 1:
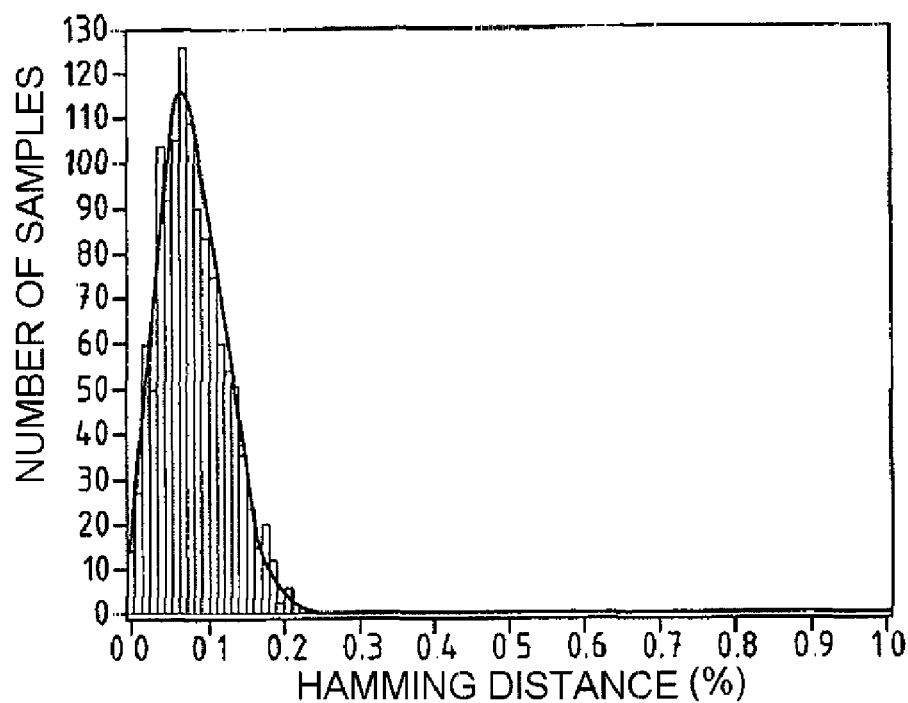
FIG. 1 is a graph giving an exemplary distribution of the Hamming distances relating to two biometric measurements for one and the same individual.

FIG. 1 illustrates an example of such a variation when the biometric data considered are irises coded on 2048 binary elements or bits. It gives a distribution of the Hamming distances observed over 1028 pairs of measurements, the two measurements of each pair relating to one and the same iris. It is recalled that the Hamming distance between two binary strings of the same length is the number of bits of like rank which differ between the two strings. It is expressed as a percentage in FIG. 1. Thus, a Hamming distance of 0.1 indicates that 10% of the bits of like rank differ between two measurements of the same iris.

Figure 2:
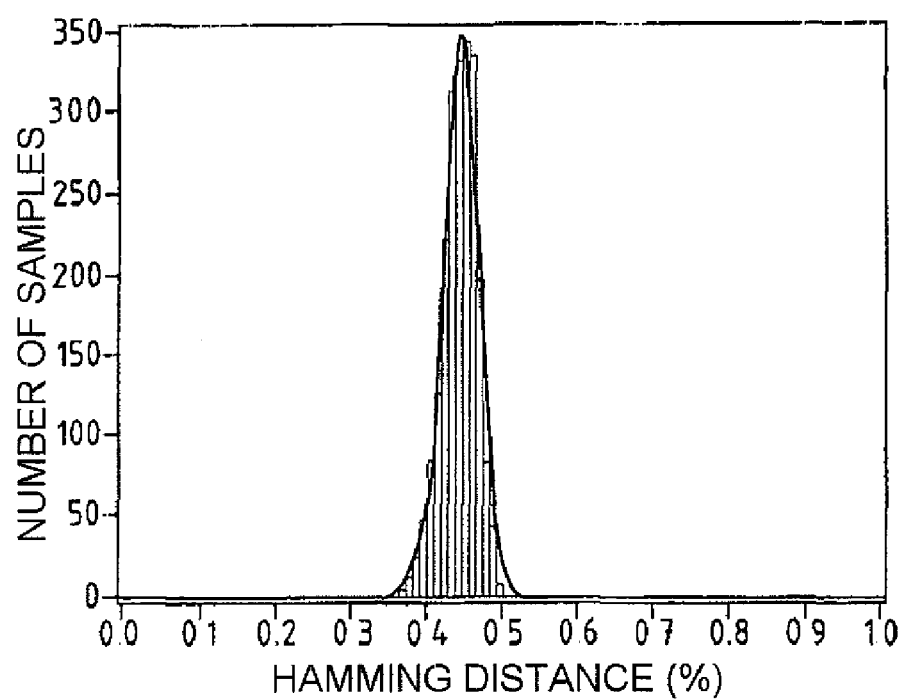
FIG. 2 is a graph giving an exemplary distribution of the Hamming distances relating to two biometric measurements for different individuals.

FIG. 2 gives a representation of the same type as FIG. 1 in the case where the two measurements of each pair relate to distinct irises, that is to say to irises of different individuals. This distribution makes it possible to note that the Hamming distance is generally higher in the case of FIG. 2 than in that of FIG. 1. This signifies that the variability between two measurements of one and the same iris is much less than the mean difference between two measurements of different irises.

Figure 3:
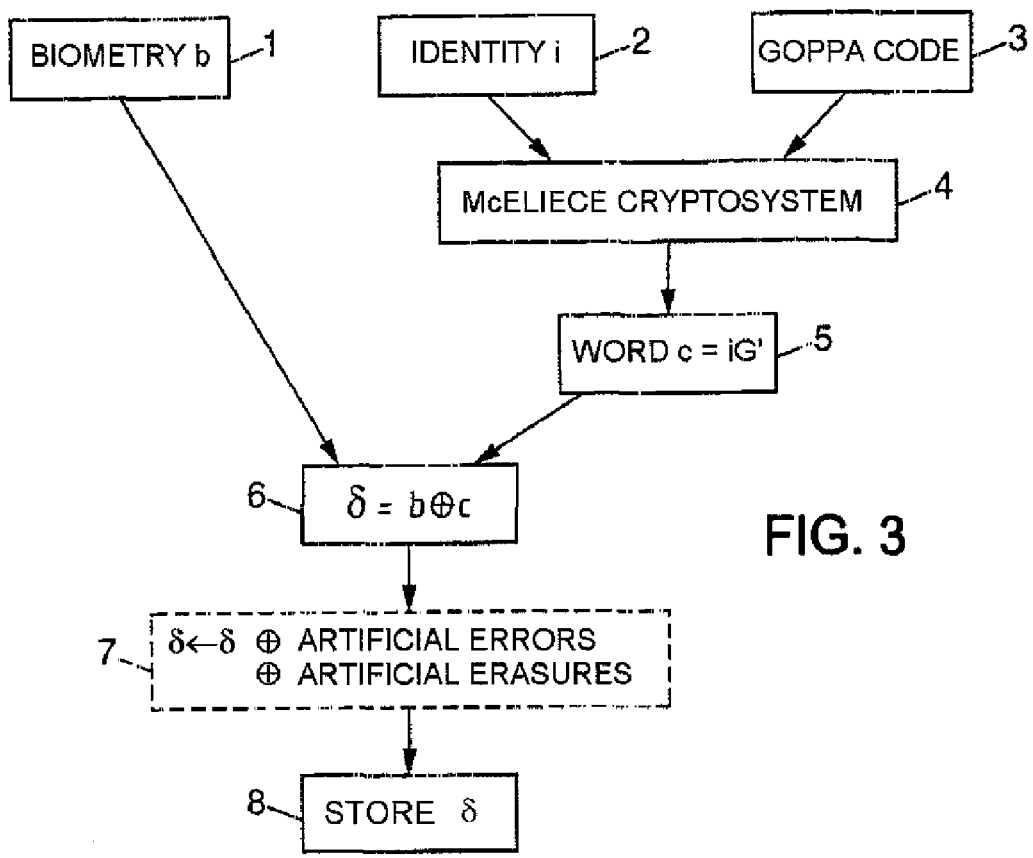
FIG. 3 is a flowchart showing steps of an enrolment procedure according to an embodiment of the invention.

FIG. 3 shows the steps of an enrolment according to an embodiment of the invention. This enrolment comprises a coding of biometric data. Thus, when an individual turns up for an enrolment, biometric data of this individual are initially detected (step 1). A biometry b of the individual in question is thus obtained in the form of a binary string.

Moreover, an item forms the subject of a coding. In the example illustrated in FIG. 3, this item is an identity i of the individual who turns up for an enrolment (step 2). This identity may for example be obtained after verification of a piece of identity of this individual.

A code, for example, a Goppa code, is then chosen to code the identity i (step 3). Goppa codes are state of the art error correcting codes able to correct a certain quantity of error's for example in a transmission of binary data. The Goppa code is in particular chosen to correct a quantity of errors in the range of errors of FIG. 1, for example about the mean of the Hamming distances observed in FIG. 1, but not a quantity of errors in the range of errors of FIG. 2, so as not to wrongly conclude that there exists an identity between the biometries of two different individuals.

Subsequently, the identity i is coded according to an algorithm such as the McEliece cryptosystem, using the chosen Goppa code (step 4). The McEliece cryptosystem is in particular described in the document entitled "A public-key cryptosystem based on algebraic coding theory" by R. J. McEliece, published in the January-February 1978 issue of the journal "DSN Progress Report 42-44". It makes it possible to conceal the code used so that the algebraic structure of the latter cannot be retrieved by an unauthorized person. Thus, the decoding of the coded item can be carried out only by a sanctioned person.

On completion of step 4, the identity i is coded in the form of a linear code word (step 5). The word c thus obtained is of the form c=IG', where G' is a matrix formed from another matrix G of dimension k*n, with k representing the dimension of the Goppa code chosen such that k≧n−tm, n=$2^m$ is the length of the Goppa code chosen, m is an integer and t is the maximum number of errors that the coding is capable of correcting. G' is expressed in the following manner: G'=SGP, where S is a regular invertible matrix of dimension k*k and P is a random permutation matrix of dimension n*n. The pair (S,P) is sometimes called a "trapdoor". Only a person having the trapdoor is able to effortlessly decode the word c obtained. This is all the more true as the word c is in reality marred by errors, as will be detailed subsequently.

In step 6, a quantity δ is calculated as an exclusive OR of the biometry b and of the code word c obtained in step 5, i.e. δ=b⊕c. This quantity, which may be seen substantially as a coding of the biometry b by the code word c is finally stored so as to be held in a database (step 8). It will be noted that, in contradistinction to the prior art method described in WO 00/51244, only a quantity δ is stored in conjunction with each individual forming the subject of an enrolment, and not a pair of values (h(c),δ), thereby making it possible to limit the quantity of information to be stored.

Optionally, the value of δ is modified before being stored. For this purpose, a certain number of bits of the binary string b⊕c are erased and others are modified. This is what is shown schematically in step 7 by the expression: δ←δ⊕ artificial errors ⊕ artificial erasures. The extent and the benefit of such an operation will be explained subsequently, with reference to FIG. 4.

As a variant, artificial errors and artificial erasures may be optionally introduced directly into the word c in steps 4-5, this likewise amounting to adding them to the quantity δ arising from c, since δ=b⊕c.

Figure 4:
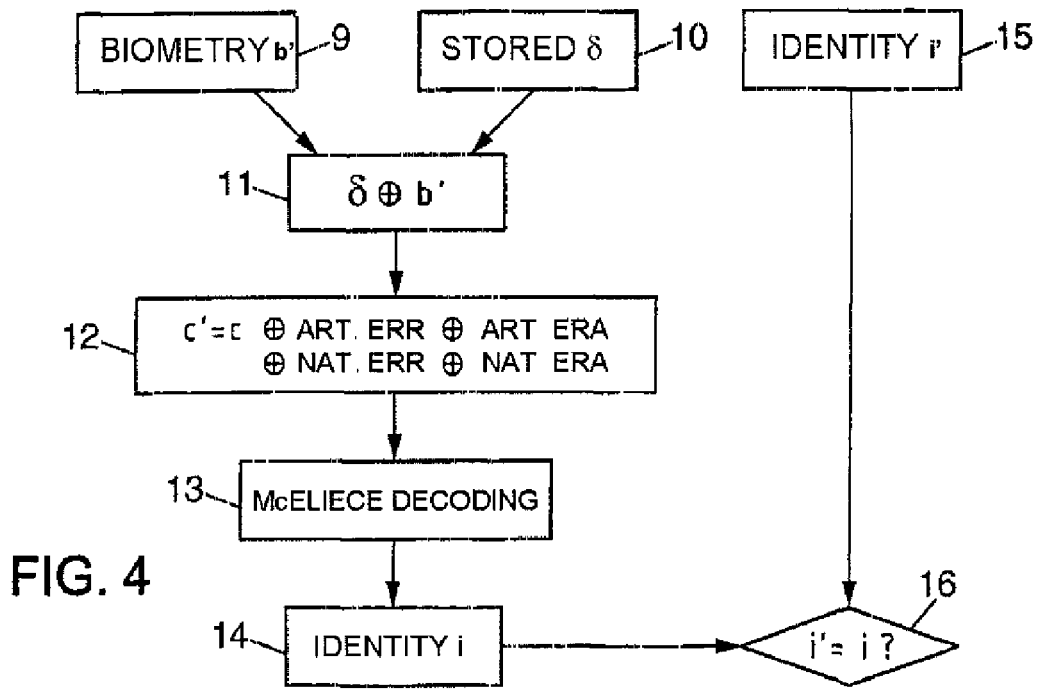
FIG. 4 is a flowchart showing steps of an identity check according to an embodiment of the invention.

FIG. 4 is a flowchart showing the steps of an identity check according to an embodiment of the invention. By identity check should be understood the verification of the presence of the biometry of an individual in the database holding the values of δ mentioned above. When the enrolment of the individual has been previously performed with the aid of an identity of this individual, as in the example illustrated in FIG. 3, the identity check can furthermore comprise a genuine verification of the identity, as will be described further on.

When one wishes to verify whether an individual has formed the subject of a prior enrolment, one therefore proceeds in the following manner. First of all one performs a biometric measurement of this individual. One thus obtains a biometry b' (step 9). If the individual in question has already formed the subject of an enrolment on the basis of a biometry b, it is then possible to consider that b' is a binary string similar to b to within a few binary elements. This can be expressed in this way: b'=b⊕natural errors⊕natural erasures. The quantity of natural errors and erasures is, for example, of the order of the Hamming distances represented in FIG. 1, in the case where the biometries b and b, are digital codings of irises.

In step 11, one performs an exclusive OR between the biometry b' measured in step 9, and each of the δ held (step 10) in the previously constructed database. This operation makes it possible to obtain a value c' close to the code word c of step 5 to within binary errors and erasures. Thus, c' may be written c'=c⊕natural errors⊕natural erasures, that for simplicity may be written c'=c⊕nat. err.⊕nat, era. These natural errors and erasures constitute a random error e marring the word c in accordance with the McEliece cryptosystem.

Since the code word c conceals an item as explained above, it is appropriate to perform a decoding on the basis of the result of step 12, with the aid of the McEliece cryptosystem (step 13). To do this, we multiply c' by the inverse of the matrix P, i.e. c'$P^{-1}$. This expression can be likened to a word of the chosen Goppa code. As described in the document "A public-key cryptosystem based on algebraic coding theory" it is possible to retrieve the value is. From this we then deduce the item i (step 14) by multiplying iS by the inverse of the matrix S, i.e. i=iS$S^{-1}$. Stated otherwise, we retrieve the item coded during the enrolment of the individual considered, by virtue of the knowledge of the trapdoor, that is to say of the pair of matrices (S,P).

The fact of obtaining, in step 14, an item concealed in the code c' constitutes an index according to which the biometry b' could correspond to the biometry b which has been previously coded with the aid of the word c, that is to say that the individual considered has formed the subject of a prior enrolment.

In the example described with reference to FIGS. 3 and 4, the item i is an identity of the enrolled individual. Once the identity i has been retrieved in step 14, this identity i can then advantageously be compared with an identity i' provided by the relevant individual. If these identities match, this confirms that the individual in question is indeed the one who formed the subject of a prior enrolment.

Of course, items other than the identity of the individual may be used as indicated above, in as much as the individual has these items himself, for verification purposes. By way of example, the words of the chosen Goppa code may be obtained on the basis of a password known by the individual having formed the subject of an enrolment. After the decoding of this code word, it is possible to ask the individual for his password so as to compare it with that concealed in the code word in question.

By virtue of the mechanisms described above, one ensures that only the persons having the trapdoor, which constitutes a secret item, can verify whether an individual has formed the subject of a prior enrolment. Conversely, a malicious person not having the trapdoor will be unable to perform such a check.

It will be noted that this result is obtained on account of the fact that differences exist between two biometric measurements b and b' relating to the same individual, these differences constituting a random error complicating the decoding for a person not having the trapdoor. However, in rare cases where two biometric measurements b and b' relating to the same individual are absolutely identical, that is to say where the Hamming distance separating these two measurements is zero, the decoding of the item i would be easier for a malicious person.

It is to preclude such a situation that artificial erasures and errors have been introduced into the values of δ in the optional step 7. These errors are introduced into the word c' obtained in step 12. One thus ensures that random errors are always present in the code word obtained, even in the case of identical biometric measurements, thereby rendering the decoding quasi-impossible without knowledge of the McEliece trapdoor.

The quantity of artificial erasures and errors to be introduced into the system depends on the level of difficulty of decoding that one seeks to obtain. Specifically, the higher this quantity, the more complex the decoding is rendered on account of the random nature of the coding. However, this quantity must not lead to the exceeding of the quantity of errors that the Goppa code chosen is capable of correcting. The probability of successfully retrieving of the item i included in a code word c, without knowing the trapdoor, can be approximated by $$\frac{C_{n-k}^{\tau}}{C_n^{\tau}},$$

where τ represents a number of errors.

Consider, by way of nonlimiting example, the case where according to the notation introduced above, m=13 and t=410. We therefore know how to correct 5% (=410/2$^{13}$) of errors over the code length. If b' contains 1.5% (that is to say 123 in absolute value) of natural errors with respect to n, we can therefore still introduce 3.5% of artificial errors, without limiting the performance of the decoding. On the other hand, the rate of artificial+natural errors must not exceed 5% so as not to always prevent the system from concluding that there is a match between b and b'. It will, however, be noted that even if no artificial error is introduced, the system nevertheless exhibiting 1.5% of natural errors, it is then very difficult to retrieve the coded item without knowing the trapdoor.

The method of coding biometric data described above, with reference to FIG. 3, can be implemented in a coding device. Likewise, the method described with reference to FIG. 4 and making it possible to verify that an individual has formed the subject of a prior enrolment can be implemented in a checking device. These devices may possibly form part of one and the same system.

The invention claimed is:

1. A method of coding biometric data associated with respective individuals, comprising the following steps:
    obtaining biometric data associated with an individual;
    generating a word relating to an error correcting code chosen so as to correct a quantity of errors in conjunction with a statistical quantity of errors between two biometric measurements relating to one and the same individual, the word concealing, with the aid of a private function, an item relating to said individual;
    performing a combination between the biometric data obtained and the word generated.

2. The method as claimed in claim 1, in which said combination is an exclusive OR between the biometric data obtained and the word generated.

3. The method as claimed in claim 1, in which the item concealed in the word generated is an identity of said individual.

4. The method as claimed in one of the preceding claim 1, in which the generation of the word concealing, with the aid of a private function, an item relating to said individual is in accordance with the McEliece cryptosystem.

5. The method as claimed in claim 1, in which a substantially predetermined quantity of binary elements of the word generated or of the result of the combination between the biometric data obtained and the word generated is modified or erased.

6. The method as claimed in claim 5, in which the substantially predetermined quantity of binary elements of the word generated that is modified or that is erased is fixed as a function of a preset level of difficulty of retrieving the item concealed in said word, without knowing said private function, and of the statistical quantity of errors between two biometric measurements relating to one and the same individual.

7. The method as claimed in claim 5, in which the sum of said substantially predetermined quantity of binary elements of the word generated that is modified or that is erased and of said statistical quantity of errors between two biometric measurements relating to one and the same individual is less than or equal to the quantity of errors that the error correcting code chosen can correct.

8. The method as claimed in claim 1, in which the result of the combination between the biometric data obtained and the word generated is stored.

9. A method of checking identity on the basis of previously stored biometric data, the biometric data being associated with respective individuals and each being coded with a respective word relating to an error correcting code, each word concealing, with the aid of a private function, an item relating to the individual associated with the corresponding biometric data, the error correcting code being chosen so as to correct a quantity of errors in conjunction with a statistical quantity of errors between two biometric measurements relating to one and the same individual, the method comprising the following steps:
    performing a biometric measurement relating to an individual;
    performing a combination between said biometric measurement and certain at least of the stored coded biometric data; and
    decoding the result of said combination on the basis of said private function, so as to retrieve the item concealed in the word with which the biometric data associated with said individual have been previously coded.

10. The method as claimed in claim 9, in which said combination is an exclusive OR between said biometric measurement and certain at least of the stored coded biometric data.

11. The method as claimed in claim 9, in which said item concealed in a word relating to the error correcting code, with which the biometric data associated with an individual are coded, is an identity of said individual.

12. The method as claimed in claim 11, furthermore comprising a step in which a check is carried out to verify that the identity retrieved after decoding of the result of the combination between the biometric measurement relating to said individual and certain at least of the stored coded biometric data corresponds to an identity provided by said individual.

13. The method as claimed in claim 9, in which the coding of the biometric data with a respective word relating to an error correcting code, each word concealing, with the aid of a private function, an item relating to the individual associated with the corresponding biometric data, complies with the McEliece cryptosystem.

14. The method as claimed in claim 9, in which each word with which respective biometric data are coded comprises a substantially predetermined quantity of modified or erased binary elements.

15. The method as claimed in claim 14, in which the substantially predetermined quantity of modified or erased binary elements for each word is fixed as a function of a preset level of difficulty of retrieving the item concealed in said word, without knowing said private function, and of said statistical quantity of errors between two biometric measurements relating to one and the same individual.

16. The method as claimed in claim 14, in which the sum of said substantially predetermined quantity of modified or erased binary elements for each word and of said statistical quantity of errors between two biometric measurements relating to one and the same individual is less than or equal to the quantity of errors that the error correcting code chosen can correct.

17. A coding device for coding biometric data associated with respective individuals, the coding device comprising:
   means for obtaining biometric data associated with an individual;
   means for generating a word relating to an error correcting code chosen so as to correct a quantity of errors in conjunction with a statistical quantity of errors between two biometric measurements relating to one and the same individual, the word concealing, with the aid of a private function, an item relating to said individual;
   means for performing a combination between the biometric data obtained and the word generated.

18. The coding device as claimed in claim 17, in which the means for performing a combination between the biometric data obtained and the word generated are arranged for calculating an exclusive OR between the biometric data obtained and the word generated.

19. The coding device as claimed in claim 17, in which the item concealed in the word generated is an identity of said individual.

20. The coding device as claimed in claim 17, in which the means for generating a word concealing, with the aid of a private function, an item relating to said individual are in accordance with the McEliece cryptosystem.

21. The coding device as claimed in claim 17, comprising means for modifying or erasing a substantially predetermined quantity of binary elements of the word generated or of the result of the combination between the biometric data obtained and the word generated.

22. The coding device as claimed in claim 21, in which the substantially predetermined quantity of binary elements of the word generated that is modified or that is erased by said means for modifying or erasing is fixed as a function of a preset level of difficulty of retrieving the item concealed in said word, without knowing said private function, and of the statistical quantity of errors between two biometric measurements relating to one and the same individual.

23. The coding device as claimed in claim 21, in which the sum of said substantially predetermined quantity of binary elements of the word generated that is modified or that is erased by said means for modifying or erasing and of said statistical quantity of errors between two biometric measurements relating to one and the same individual is less than or equal to the quantity of errors that the error collecting code chosen can correct.

24. The coding device as claimed in claim 17, comprising means for storing the result of the combination between the biometric data obtained and the word generated.

25. A checking device for checking identity on the basis of previously stored biometric data, the biometric data being associated with respective individuals and each being coded with a respective word relating to an error correcting code, each word concealing, with the aid of a private function, an item relating to the individual associated with the corresponding biometric data, the error correcting code being chosen so as to correct a quantity of errors in conjunction with a statistical quantity of errors between two biometric measurements relating to one and the same individual, the checking device comprising:
   means for performing a biometric measurement relating to an individual;
   means for performing a combination between said biometric measurement and certain at least of the stored coded biometric data; and
   means for decoding the result of said combination on the basis of said private function, so as to retrieve the item concealed in the word with which the biometric data associated with said individual have been previously coded.

26. The checking device as claimed in claim 25, in which the means for performing a combination between said biometric measurement and certain at least of the stored coded biometric data are arranged for calculating an exclusive OR between said biometric measurement and certain at least of the stored coded biometric data.

27. The checking device as claimed in claim 25, in which said item concealed in a word relating to the error correcting code, with which the biometric data associated with an individual are coded, is an identity of said individual.

28. The checking device as claimed in claim 27, furthermore comprising means for verifying that the identity retrieved after decoding of the result of the combination between the biometric measurement relating to said individual and certain at least of the stored coded biometric data corresponds to an identity provided by said individual.

29. The checking device as claimed in claim 25, in which the coding of the biometric data with a respective word relating to an error correcting code, each word concealing, with the aid of a private function, an item relating to the individual associated with the corresponding biometric data, complies with the McEliece cryptosystem.

30. The checking device as claimed in claim 25, in which each word with which respective biometric data are coded comprises a substantially predetermined quantity of modified or erased binary elements.

31. The checking device as claimed in claim 30, in which the substantially predetermined quantity of modified or erased binary elements for each word is fixed as a function of a preset level of difficulty of retrieving the item concealed in said word, without knowing said private function, and of said statistical quantity of errors between two biometric measurements relating to one and the same individual.

32. The checking device as claimed in claim 30, in which the sum of said substantially predetermined quantity of modified or erased binary elements for each word and of said statistical quantity of errors between two biometric measurements relating to one and the same individual is less than or equal to the quantity of errors that the error correcting code chosen can correct.

* * * * *